United States Patent
Komatsu

(10) Patent No.: US 8,723,457 B2
(45) Date of Patent: May 13, 2014

(54) ELECTRIC VEHICLE AND CONTROL METHOD OF ELECTRIC VEHICLE

(75) Inventor: Masayuki Komatsu, Aichi-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 307 days.

(21) Appl. No.: 13/320,207

(22) PCT Filed: May 14, 2009

(86) PCT No.: PCT/JP2009/059009
§ 371 (c)(1),
(2), (4) Date: Nov. 11, 2011

(87) PCT Pub. No.: WO2010/131352
PCT Pub. Date: Nov. 18, 2010

(65) Prior Publication Data
US 2012/0049771 A1    Mar. 1, 2012

(51) Int. Cl.
*H02P 1/00* (2006.01)
(52) U.S. Cl.
USPC .......................... 318/139; 320/116; 180/65.1
(58) Field of Classification Search
USPC .......... 318/139, 800; 320/116, 127, 128, 132; 180/65.1, 65.21, 65.29
See application file for complete search history.

(56) References Cited

U.S. PATENT DOCUMENTS

| 7,049,792 | B2 * | 5/2006 | King | 320/126 |
| 7,352,154 | B2 * | 4/2008 | Cook | 320/116 |
| 2002/0113577 | A1 * | 8/2002 | Purdy | 320/137 |
| 2004/0201365 | A1 * | 10/2004 | Dasgupta et al. | 320/116 |

FOREIGN PATENT DOCUMENTS

| JP | 2004-343934 A | 12/2004 |
| JP | 2007-137275 A | 6/2007 |
| JP | 2008-109840 A | 5/2008 |
| JP | 2008-206300 A | 9/2008 |
| JP | 2008-220084 A | 9/2008 |

OTHER PUBLICATIONS

International Search Report mailed Aug. 4, 2009 of PCT/JP2009/059009.

* cited by examiner

*Primary Examiner* — Rina Duda
(74) *Attorney, Agent, or Firm* — Kenyon & Kenyon LLP

(57) ABSTRACT

In the case the gearshift position is the parking position at the state that the master battery is connected via the master side step-up circuit to the motor side and either of the two slave batteries is connected via the slave side step-up circuit to the motor side, the drive of both of the master side step-up circuit and the slave side step-up circuit is stopped. After then, in the case that the accumulated charge ratio difference obtained by subtracting the accumulated charge ratio of the master battery from the accumulated charge ratio of the slave battery connected to the motor side is less than the threshold value, the drive stop of both of the master side step-up circuit and the slave side step-up circuit is continued.

7 Claims, 8 Drawing Sheets

ELECTRIC VEHICLE AND CONTROL METHOD OF ELECTRIC VEHICLE

This is a 371 national phase application of PCT/JP2009/059009 filed 14 May 2009, the contents of which are incorporated herein by reference.

TECHNICAL FIELD

The present invention relates to an electric vehicle and a control method of an electric vehicle.

BACKGROUND ART

One proposed electric vehicle has a motor generator, an inverter that drives the motor generator, a first electric storage device, a first converter that performs voltage conversion between the first electric storage device and both of a main positive bus line and a main negative bus line connected to the inverter, the second electric storage device, and a second converter that performs voltage conversion between the second electric storage device and both of the main positive bus and the main negative bus line (see, for example, Patent Document 1). In this electric vehicle, a discharge power distribution ratio of the each storage device is calculated according to a ratio of remaining electric energy, where a current SOC reaches to a preset SOC that allowable discharge power is restricted, of each of the electric storage devices. A charge power distribution ratio of the each storage device is also calculated according to a ratio of allowable charge energy, where a current SOC reaches to a second preset SOC that allowable charge power is restricted, of each of the electric storage devices. Each converter is controlled according to the discharge power distribution ratio in a case that electric power is supplied from a power supply system to a driving power generation unit. On the other hand, the each converter is controlled according to the charge power distribution ratio in a case that the electric power is supplied from the driving power generation unit to the power supply system. Such control prevents a case that either electric storage device reaches discharge termination or charge termination earlier than another electric storage device.

PRIOR ART DOCUMENT

Patent Document

Patent Document 1: Japanese Patent Laid-Open No. 2008-109840

SUMMARY OF THE INVENTION

In such electric vehicle, it is a part of problems that energy efficiency of the electric vehicle is enhanced and ride quality is enhanced. As a way to solve such problems, it is required to prevent wasteful electricity consumption and noise, in a case that a gearshift position is a parking position, that is, it is not necessary to drive an engine and two motor generators.

In an electric vehicle and a control method of an electric vehicle of the invention, the main object of the invention is to prevent wasteful electricity consumption and noise in a case that gearshift position is a parking position.

In order to attain the main object, the electric vehicle and the control method of the electric vehicle of the invention have the configurations discussed below.

According to one aspect, the present invention is directed to an electric vehicle. The electric vehicle driven with output power from a motor, includes: a first battery unit that has at least one secondary battery; a second battery unit that has at least one secondary battery; a first step-up/down circuit that transmits electric power with voltage regulation between a first battery voltage system connected to the at least one secondary battery of the first battery unit and a motor side; a second step-up/down circuit that transmits electric power with voltage regulation between a second battery voltage system connected to the at least one secondary battery of the second battery unit and the motor side; and a control module that controls the first step-up/down circuit and the second step-up/down circuit so that drive of both of the first step-up/down circuit and the second step-up/down circuit is stopped in a parking case that a gearshift position is a parking position.

In the electric vehicle according to this aspect of the invention, the first step-up/down circuit transmitting electric power with voltage regulation between a first battery voltage system connected to the at least one secondary battery of the first battery unit and a motor side, and the second step-up/down circuit transmitting electric power with voltage regulation between a second battery voltage system connected to the at least one secondary battery of the second battery unit and the motor side are controlled so that drive of both of the first step-up/down circuit and the second step-up/down circuit is stopped in a parking case that a gearshift position is a parking position. This arrangement enables to prevent electricity consumption (loss) and noise by driving the first step-up/down circuit and the second step-up/down circuit in the parking case.

In one preferable application of the electric vehicle of the invention, the control module may control the first step-up/down circuit and the second step-up/down circuit to supply electric power from the at least one secondary battery of the second battery unit to at least one device connected to the first battery voltage system until an accumulated charge ratio difference becomes less than or equal to a second predetermined value that is less than a predetermined value, in a case that the accumulated charge ratio difference is more than the predetermined value even in the parking case, the accumulated charge ratio difference being obtained by subtracting a first accumulated charge ratio that is a ratio of an accumulated charge amount of the at least one secondary battery of the first battery unit to whole capacity of the at least one secondary battery of the first battery unit from the second accumulated charge ratio that is a ratio of an accumulated charge amount of the at least one secondary battery of the second battery unit to whole capacity of the at least one secondary battery of the second battery unit. This arrangement enables to supply the electric power from the at least one secondary battery of the second battery unit to at least one device connected to the first battery voltage system. As a result, this arrangement enables to prevent the accumulated charge ratio of the at least one secondary battery of the first battery unit from decreasing too much without changing the accumulated charge ratio of the at least one secondary battery of the secondary battery unit. The 'predetermined value' may be fixed to a specific value or be set based on the accumulated charge ratio difference obtained at system startup of the electric vehicle or at a change of the gearshift position from a position other than the parking position to the parking position. In this application, the control module may control the first step-up/down circuit and the second step-up/down circuit to supply the electric power from the at least one secondary battery of the second battery unit to the at least one device connected to the first battery voltage system until the accumulated charge ratio difference becomes less than or equal to the second predetermined value, in a case that the accumulated charge ratio difference becomes more than the predetermined value by electric power supply from the at least one secondary battery of the first battery unit to the at least one device connected to the first battery voltage system in the parking case.

In another preferable application of the electric vehicle of the invention, the at least one device connected to the first battery voltage system may include at least one of a compressor in an air conditioner, and a DC-to-DC converter connected to the first battery voltage system and an auxiliary secondary battery supplying electric power to accessories.

In still another preferable application of the electric vehicle of the invention, the electric vehicle may further include: a first connect/disconnect unit that connects and disconnects the at least one secondary battery of the first battery unit to and from the motor side; and a second connect/disconnect unit that connects and disconnects the at least one secondary battery of the second battery unit to and from the motor side. In this electric vehicle, the first battery unit may have one main secondary battery as a secondary battery, the second battery unit may have two or more auxiliary secondary batteries as secondary batteries, and the control module may control the main connect/disconnect unit so that the main secondary battery is connected to the motor side and may control the second connect/disconnect unit so that the auxiliary secondary batteries are sequentially switched and connected to the motor side.

In one preferable application of the electric vehicle of the invention, the electric vehicle may further include: an internal combustion engine; a generator that inputs and outputs power; and a planetary gear mechanism with three elements each connected to three shafts, an output shaft of the internal combustion engine, a rotating shaft of the generator, and a driveshaft linked to an axle of the electric vehicle. In this electric vehicle, the first step-up/down circuit may transmit electric power with voltage regulation between the first battery voltage system and both of the generator and the motor, and the second step-up/down circuit may transmit electric power with voltage regulation between the second battery voltage system and both of the generator and the motor.

In one preferable application of the electric vehicle of the invention, the electric vehicle may further include: a charger connected to an external power supply in a system shutdown state of the electric vehicle to charge the two or more secondary battery with electric power from the external power supply.

According to another aspect, the present invention is directed to a control method of an electric vehicle having a motor that inputs and outputs power for driving the electric vehicle, a first battery unit that has at least one secondary battery, a second battery unit that has at least one secondary battery, a first step-up/down circuit that transmits electric power with voltage regulation between a first battery voltage system connected to the at least one secondary battery of the first battery unit and a motor side, and a second step-up-down circuit that transmits electric power with voltage regulation between a second battery voltage system connected to the at least one secondary battery of the second battery unit and the motor side, the control method of the electric vehicle includes: controlling the first step-up/down circuit and the second step-up/down circuit so that drive of both of the first step-up/down circuit and drive of the second step-up/down circuit are stopped in a parking case that a gearshift position is a parking position.

In the control method of the electric vehicle according to this aspect of the invention, the first step-up/down circuit transmitting electric power with voltage regulation between a first battery voltage system connected to the at least one secondary battery of the first battery unit and a motor side, and the second step-up/down circuit transmitting electric power with voltage regulation between a second battery voltage system connected to the at least one secondary battery of the second battery unit and the motor side are controlled so that drive of both of the first step-up/down circuit and the second step-up/down circuit is stopped in a parking case that a gearshift position is a parking position. This arrangement enables to prevent electricity consumption (loss) and noise by driving the first step-up/down circuit and the second step-up/down circuit in the parking case.

In one preferable application of the control method of the electric vehicle of the invention, the control method may control the first step-up/down circuit and the second step-up/down circuit to supply electric power from the at least one secondary battery of the second battery unit to at least one device connected to the first battery voltage system until an accumulated charge ratio difference becomes less than or equal to a second predetermined value that is less than a predetermined value, in a case that the accumulated charge ratio difference is more than the predetermined value even in the parking case, the accumulated charge ratio difference being obtained by subtracting a first accumulated charge ratio that is a ratio of an accumulated charge amount of the at least one secondary battery of the first battery unit to whole capacity of the at least one secondary battery of the first battery unit from the second accumulated charge ratio that is a ratio of an accumulated charge amount of the at least one secondary battery of the second battery unit to whole capacity of the at least one secondary battery of the second battery unit. This arrangement enables to supply the electric power from the at least one secondary battery of the second battery unit to at least one device connected to the first battery voltage system. As a result, this arrangement enables to prevent the accumulated charge ratio of the at least one secondary battery of the first battery unit from decreasing too much without changing the accumulated charge ratio of the at least one secondary battery of the secondary battery unit.

The 'predetermined value' may be fixed to a specific value or be set based on the accumulated charge ratio difference at system startup of the electric vehicle or at a change of the gearshift position from a position other than the parking position to the parking position. In this application, the control method may control the first step-up/down circuit and the second step-up/down circuit to supply the electric power from the at least one secondary battery of the second battery unit to the at least one device connected to the first battery voltage system until the accumulated charge ratio difference becomes less than or equal to the second predetermined value, in a case that the accumulated charge ratio difference becomes more than the predetermined value by electric power supply from the at least one secondary battery of the first battery unit to the at least one device connected to the first battery voltage system in the parking case.

MODES FOR CARRYING OUT THE INVENTION

One mode for carrying out the invention is discussed below as a preferred embodiment.

Figure 1:
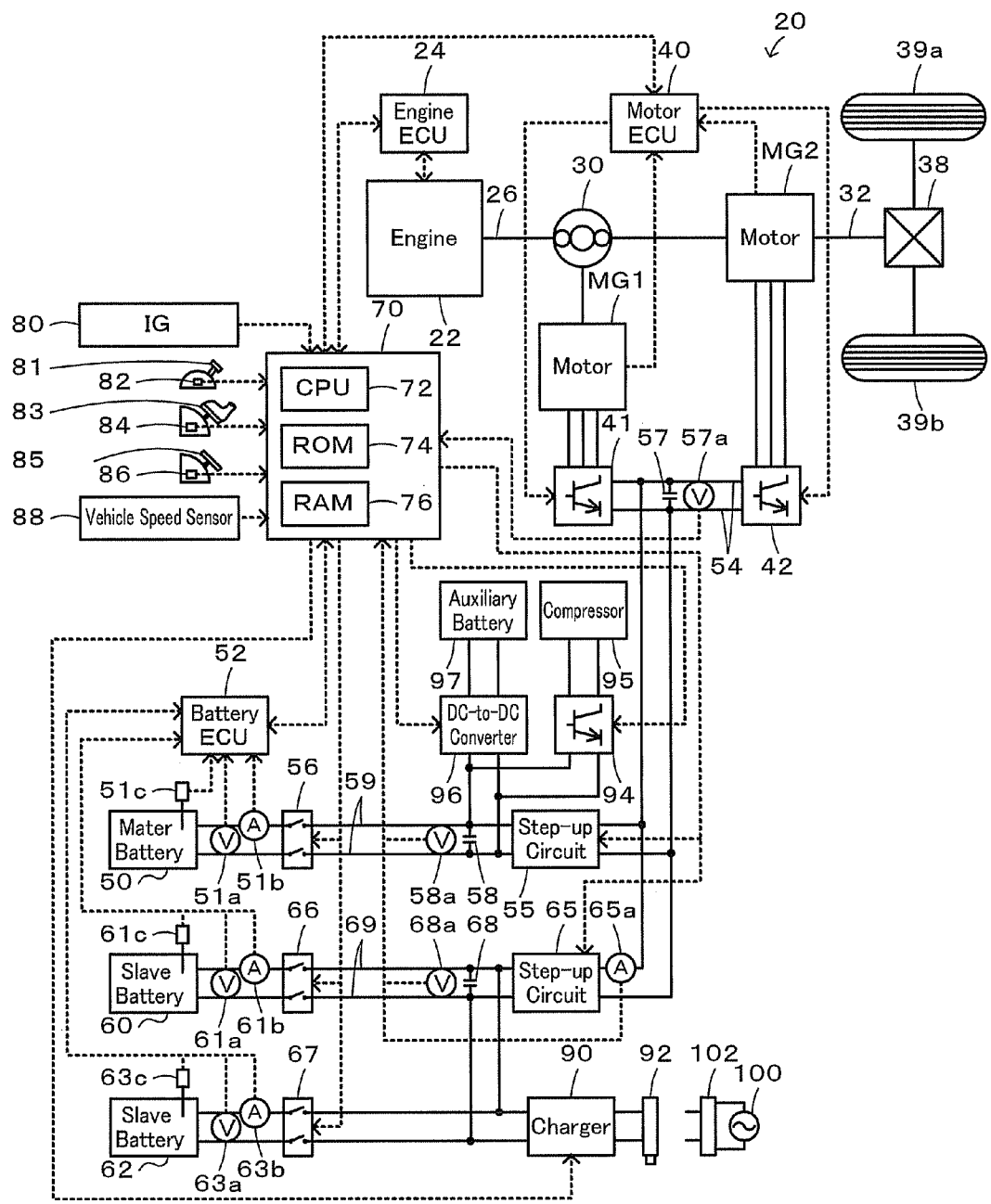
FIG. 1 schematically illustrates the configuration of a hybrid vehicle 20 in one embodiment according to the invention.

FIG. 1 schematically illustrates the configuration of a hybrid vehicle 20 in one embodiment according to the invention. As illustrated, the hybrid vehicle 20 of the embodiment includes an engine 22 that consumes a fuel such as gasoline or light oil, an engine electronic control unit (hereafter referred to as engine ECU) 24 that controls the engine 22, a planetary gear 30 that has a carrier connected to a crank shaft 26 of the engine 22 and a ring gear connected to driveshaft 32 linked to driving wheels 39a and 39b via a differential gear 38, a motor MG1 that is constructed as a synchronous motor generator and has a rotor connected to the sun gear of the planetary gear 30, a motor MG2 that is constructed as a synchronous motor generator and has a rotor connected to the driveshaft 32, inverters 41 and 42 each for driving the motors MG1 and MG2, a motor electronic control unit (hereafter referred to as motor ECU) 40 that controls the motors MG1 and MG2 by performing switching control of non-illustrated switching elements in the inverters 41 and 42, a master battery 50 and slave batteries 60 and 62 that are each constructed as lithium-ion secondary batteries, a master side step-up circuit 55 that is connected to power lines (hereafter referred to as first battery voltage system power lines) 59 where the master battery 50 is connected via a system main relay 56 and power lines (hereafter referred to as high-voltage system power lines) 54 where the inverters 41 and 42 are connected and steps up the voltage of electric power from the master battery 50 to supply the side of the electric power the inverters 41 and 42, a slave side step-up circuit 65 that is connected to power lines (hereafter referred to as second battery voltage system power lines) 69 where the slave batteries 60 and 62 are each connected via system main relays 66 and 67 and the high-voltage system power lines 54 and steps up the voltage of electric power from a slave battery (hereafter referred to as connection slave battery) currently connected to the second battery voltage system power lines 69 between the slave batteries 60 and 62 to supply the electric power to the side of the electric power to the inverters 41 and 42, a battery electronic control unit (hereafter referred to as battery ECU) 52 that controls the master battery 50 and the slave batteries 60 and 62, a compressor 95 in a non-illustrated air conditioner that is driven with electric power supplied via an inverter 94 connected to the first battery voltage system power lines 59, a DC-to-DC converter 96 that is connected to the first battery voltage system power lines 59 and an auxiliary battery 97 supplying electric power to non-illustrated accessories and steps down the voltage of electric power from the first battery voltage system power lines 59 side to supply the electric power to the auxiliary battery 97 with step-down, a charger 90 that is connected to the second battery voltage system power lines 69, a vehicle side connector 92 that is capable of connecting to an external power supply side connector 102 connected to an alternating external power supply (for example, a domestic power supply (AC 100V)) as a power supply outside the hybrid vehicle 20, and a hybrid electronic control unit 70 that communicates with the engine ECU 24, the motor ECU 40, and the battery ECU 52 and controls the operations of the whole hybrid vehicle 20. The charger 90 includes a charging relay that makes connection and disconnection between the second battery voltage system power lines 69 and the vehicle side connector 92, an AC-to-DC converter that converts AC power from the external power supply 100 to DC power, and a DC-to-DC converter that regulates the voltage of the DC power converted by the AC-to-DC converter to supply the power to the second battery voltage system power lines 69. For convenience of explanation, the side of the inverters 41 and 42 from the master side step-up circuit 55 and the slave side step-up circuit 65 is described as a high-voltage system, the side of the master battery 50 from the master side step-up circuit 55 is described as a first low-voltage system, and the side of the slave batteries 60 and 62 from the slave side step-up circuit 65 is described as a second low-voltage system hereafter.

Figure 2:
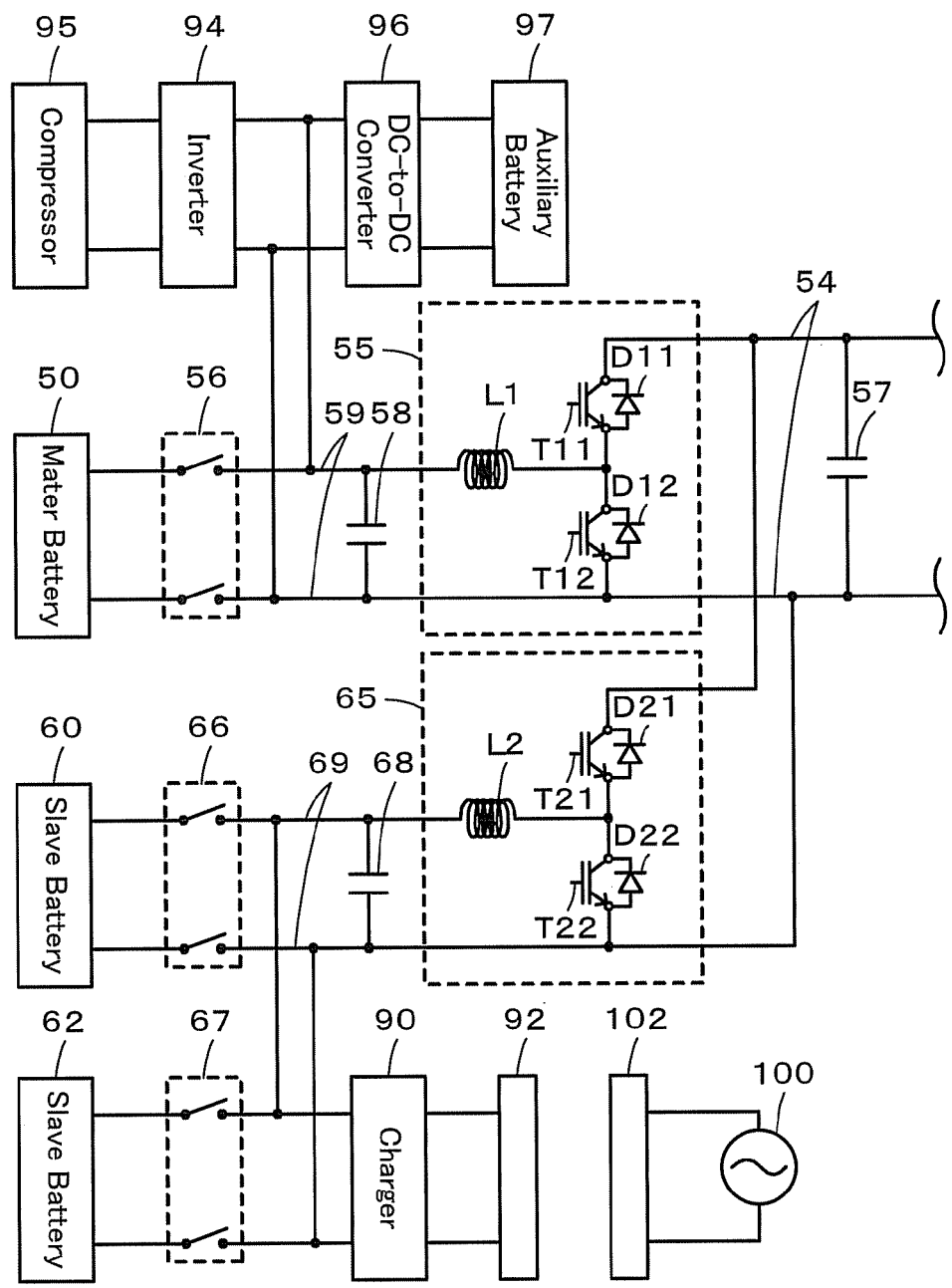
FIG. 2 shows the schematic structure of an electric system on the hybrid vehicle 20.

FIG. 2 shows the schematic structure of an electric system on the hybrid vehicle 20. As shown in FIG. 2, the master side step-up circuit 55 is constructed as a step-up converter that includes two transistors T11 and T12, two diodes D11 and D12 connected in inverse parallel with the transistors T11 and T12, and a reactor L1. The two transistors T11 and T12 are each connected to a positive electrode bus line or a negative electrode bus line of the high-voltage system power lines 54 and the reactor L1 is connected to a connection point of the transistors T11 and T12. A positive terminal and a negative terminal of the master battery 50 are each connected via system main relay 56 to a positive electrode bus line or a negative electrode bus line of the first battery voltage system power lines 59 where the reactor L1 and the negative electrode bus line of the high-voltage system power lines 54 are connected. Therefore, the switching control of the transistors T11 and T12 enables to step up the voltage of DC power from the master battery 50 to supply the DC power to the inverters 41 and 42, and to step down the voltage of DC power applied to the high-voltage system lines 54 to charge the master battery 50. A smoothing capacitor 57 is connected to the positive electrode bus line and negative electrode bus line of the high-voltage system power lines 54, and a smoothing capacitor 58 is connected to the positive electrode bus line and negative electrode bus line of the first battery voltage system power lines 59.

As shown in FIG. 2, the slave side step-up circuit 65 is connected to the positive electrode bus line and the negative electrode bus line of the high-voltage system power lines 54 in parallel with the master side step-up circuit 55 and is constructed as a step-up converter that includes two transistors T21 and T22, two diodes D21 and D22 connected in inverse parallel with the transistors T21 and T22, and a reactor L2. The two transistors T21 and T22 are each connected to the positive electrode bus line or the negative electrode bus line of the high-voltage system power lines 54 and the reactor L2 is connected to a connection point of the transistors T21 and T22. A positive terminal and a negative terminal of the slave battery 60 are each connected via system main relay 66 to a positive electrode bus line or a negative electrode bus line of the second battery voltage system power lines 69 where the reactor L2 and the negative electrode bus line of the high-voltage system power lines 54 are connected. A positive terminal and a negative terminal of the slave battery 62 are also each connected via the system main relay 67 in parallel with the system main relay 66 to the positive electrode bus line or the negative electrode bus line of the second battery voltage system power lines 69. Therefore, the switching control of the transistors T21 and T22 enables to step up the voltage of DC power from the slave battery 60 or the slave battery 62 to supply the DC power to the inverters 41 and 42, and to step down the voltage of DC power applied to the high-voltage system lines 54 to charge the slave battery 60 or the slave battery 62. A smoothing capacitor 68 is connected to the positive electrode bus line and negative electrode bus line of the second battery voltage system power lines 69.

The battery ECU 52 receives diverse signals required for control of the master battery 50 and the slave batteries 60 and 62, for example, an inter-terminal voltage Vb1 measured by a voltage sensor 51a disposed between terminals of the master battery 50, a charge-discharge current Ib1 measured by a current sensor 51b attached to an output terminal at the positive pole side of the master battery 50, a battery temperature Tb1 measured by a temperature sensor 51c attached to the master battery 50, inter-terminal voltages Vb2 and Vb3 measured by voltage sensors 61a and 63a disposed respectively between terminals of the slave batteries 60 and 62, charge-discharge currents Ib2 and Ib3 measured by current sensors 61b and 63b attached respectively to output terminals at the positive pole side of the slave batteries 60 and 62, and a battery temperature Tb2 and Tb3 measured by temperature sensors 61c and 63c attached respectively to the slave batteries 60 and 62. The battery ECU 52 outputs data relating to each state of the master battery 50 and the slave batteries 60 and 62 to the hybrid electronic control unit 70 via communication according to the requirements. The battery ECU 52 performs various arithmetic operations for management and control of the master battery 50. An accumulated charge ratio SOC1 of the master battery 50 as a ratio of an accumulated charge amount E1 of the master battery 50 to the whole capacity RC1 of the master battery 50 is calculated from an integrated value of the charge-discharge current Ib1 measured by the current sensor 51b. An input limit Win1 as an allowable charging electric power to be charged in the master battery 50 and an output limit Wout1 as an allowable discharging electric power to be discharged from the master battery 50 are set corresponding to the calculated accumulated charge amount SOC1 and the battery temperature Tb1. The battery ECU 52 performs various arithmetic operations for management and control of the slave batteries 60 and 62. Accumulated charge ratios SOC2 and SOC3 of the slave batteries 60 and 62 as ratios of accumulated charge amounts E2 and E3 of the slave batteries 60 and 62 to the whole capacities RC2 and RC3 of the slave batteries 60 and 62 are respectively calculated from integrated values of the charge-discharge currents Ib2 and Ib3 measured by the current sensors 61b and 63b. Input limits Win2 and Win3 as allowable charging electric powers to be charged in the slave batteries 60 and 62 and output limits Wout2 and Wout3 as allowable discharging electric powers to be discharged from the slave batteries 60 and 62 are set corresponding to the calculated accumulated charge amounts SOC2 and SOC3 and the battery temperature Tb2 and Tb3. The battery ECU 52 also calculates an total accumulated charge ratio SOC as a ratio of the sum (E1+E2+E3) of the accumulated charge amounts E1, E2 and E3 of the master battery 50 and the slave batteries 60 and 62 to the total capacity (RC1+RC2+RC3) of the master battery 50 and the slave batteries 60 and 62. The accumulated charge amounts E1, E2 and E3 are respectively calculated by multiplying the calculated accumulated charge ratios SOC1, SOC2 and SOC3 by the whole capacities RC1, RC2 and RC3. A concrete procedure of setting the input and output limits Win1 and Wout1 of the master battery 50 sets base values of the input limit Win1 and the output limit Wout1 corresponding to the battery temperature Tb1, specifies an input limit correction factor and an output limit correction factor corresponding to the accumulated charge amount SOC1 of the master battery 50, and multiplies the base values of the input limit Win1 and the output limit Wout1 by the specified input limit correction factor and output limit correction factor to determine the input limit Win1 and the output limit Wout1 of the master battery 50. The input and output limits Win2 and Wout2 of the slave battery 60 and the input and output limits Win3 and Wout3 of the slave battery 62 are set as well as the input and output limits Win1 and Wout1 of the master battery 50. In the embodiment, the whole capacities RC1, RC2 and RC3 of the master battery 50 and the slave batteries 60 and 62 are same (hereafter referred to as a whole capacity RC).

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57a disposed between terminals of the smoothing capacitor 57, a slave side current Ibs measured by a current sensor 65a attached to a terminal at the side of the high-voltage system power lines 54 of the slave side step-up circuit 65, a voltage (voltage of the first battery voltage system) VL1 measured by a voltage sensor 58a disposed between terminals of the smoothing capacitor 58, a voltage (voltage of the second battery voltage system) VL2 measured by a voltage sensor 68a disposed between terminals of the smoothing capacitor 68, an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs various signals via the output port: switching control signals to switching elements of the master side step-up circuit 55, switching control signals to switching elements of the slave side step-up circuit 65, driving signals to the system main relays 56, 66 and 67, driving signals to the inverter 94, driving signals to the DC-to-DC converter 96, and control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52. In the hybrid vehicle 20 of the embodiment, the gearshift position SP of the gearshift lever 81 detected by the gearshift position sensor 82 has multiple different options: a parking position (P position), a neutral position (N position), a drive position (␣D position), and a reverse position (R position).

The hybrid vehicle 20 of the embodiment thus constructed calculates a torque demand to be output to the driveshaft 32, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the driveshaft 32. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the driveshaft 32. The charge-discharge drive mode controls the operations of the engine 22 to output a quantity of power equivalent to the sum of the required level of power and a quantity of electric power consumed by charging any of the master battery 50 and the slave batteries 60 and 62 or supplied by discharging any of the master battery 50 and the slave batteries 60 and 62, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the driveshaft 32, simultaneously with charge or discharge of any of the master battery 50 and the slave batteries 60 and 62. The motor drive mode stops the operations of the engine 22 and drives and controls the motor MG2 to output a quantity of power equivalent to the required level of power to the driveshaft 32. Both of the torque conversion drive mode and the charge-discharge drive mode are a mode that controls the engine 22 and the motors MG1 and MG2 to output the required level of power to the driveshaft 32 with the operation of the engine 22. Therefore, the torque conversion drive mode and the charge-discharge drive mode are collectively considered as an engine drive mode.

In the hybrid vehicle 20 of the embodiment, upon connection between the external power supply side connector 102 and the vehicle side connector 92 after system shutdown of the hybrid vehicle 20 at home or at a predetermined charging point, the charging relay in the charger 90 is switched to ON. The master battery 50 and the slave batteries 60 and 62 are then brought to each fully charged state or a preset charge state that is less charged state than the fully charged state (for example, each state of the accumulated charge ratios SOC1, SOC2, and SOC3 equal to 80% or 85%), by switching ON/OFF the system main relays 56, 66 and 67 and controlling the master side step-up circuit 55, the slave side step-up circuit 65, and the AC-to-DC converter and DC-to-DC converter in the charger 90. When the system of the hybrid vehicle 20 is started up (by ignition on) at the state of the master battery 50 and the slave batteries 60 and 62 being charged enough as described and vehicle travelling is started, it is enabled to drive the hybrid vehicle 20 for some extent of distance (time) with the motor travel using electric power from the master battery 50 and the slave batteries 60 and 62. In the hybrid vehicle 20 of the embodiment, the slave batteries 60 and 62 are included in addition to the master battery 50, and it is thus enabled to have a longer travelling distance (travelling time) for driving the hybrid vehicle 20 with the motor travel in comparison with a vehicle only including the master battery 50.

Figure 3:
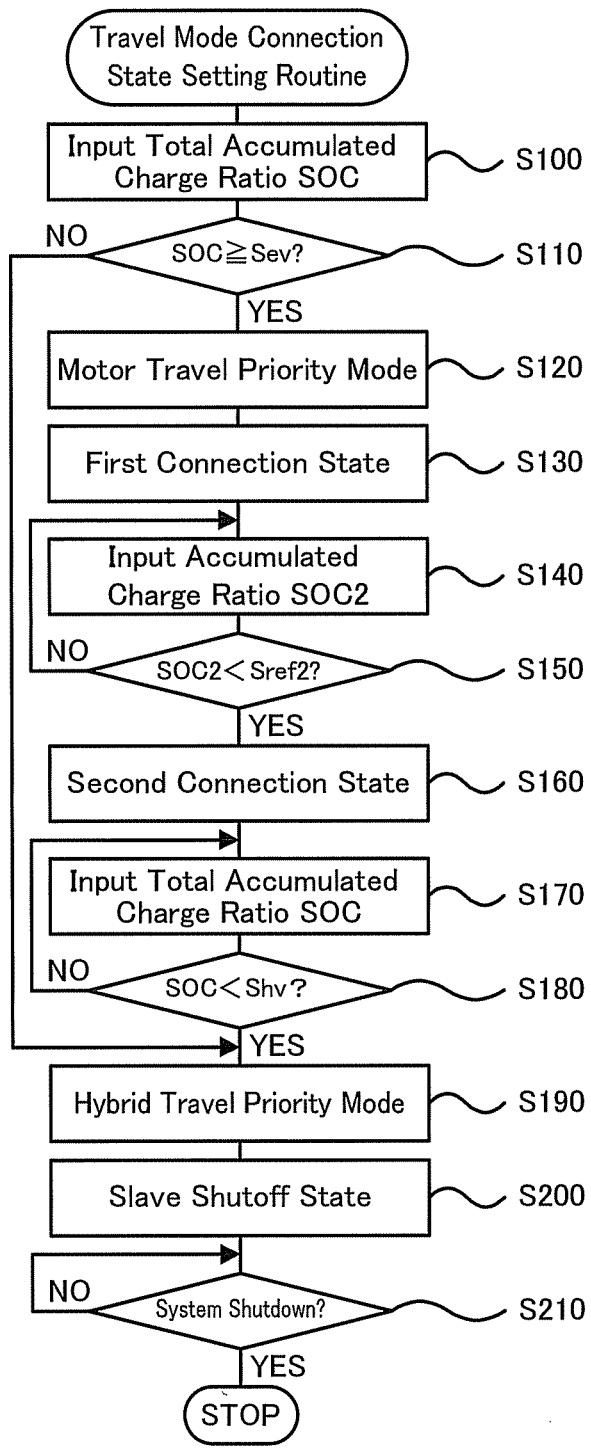
FIG. 3 is a flowchart showing a travel mode connection state setting routine executed by the hybrid electronic control unit 70 in the embodiment.

FIG. 3 is a flowchart showing a travel mode connection state setting routine executed by the hybrid electronic control unit 70 in the embodiment. The execution of this routine is started when a system of the hybrid vehicle 20 is started up. In this routine started when the system of the hybrid vehicle 20 is started up, the CPU 72 of the hybrid electronic control unit 70 inputs the total accumulated charge ratio SOC (step S100). The CPU 72 next determines whether the input total accumulated charge ratio SOC is more than or equal to a threshold value Sev (for example, 40% or 50%) that is predetermined as an accumulated charge ratio SOC allowing some extent of the motor travel (step S110). When the total accumulated charge ratio SOC is more than or equal to the threshold value Sev, the CPU 72 sets a motor travel priority mode, where the hybrid vehicle 20 is driven with a higher priority given to the vehicle travelling in the motor drive mode (the motor travel), as the travel mode (step S120), switches the system main relays 56 and 66 to ON and leads to a first connection state (where the master battery 50 and the slave battery 60 are connected with the side of the motors MG1 and MG2 and the slave battery 62 is disconnected from the side of the motors MG1 and MG2) (step S130). The total accumulated charge ratio SOC is calculated as a ratio of the sum (E1+E2+E3) of the accumulated charge amounts E1, E2 and E3 of the master battery 50 and the slave batteries 60 and 62 to the total capacity (RC1+RC2+RC3) of the master battery 50 and the slave batteries 60 and 62, and is input from the battery ECU 52 by communication. The accumulated charge amounts E1, E2 and E3 is respectively calculated by multiplying the calculated accumulated charge ratios SOC1, SOC2 and SOC3 of the master battery 50 and the slave batteries 60 and 62 by the whole capacities RC1, RC2 and RC3 of the master battery 50 and the slave batteries 60 and 62.

The hybrid vehicle 20 is driven in the motor travel priority mode while the master side step-up circuit 55 and the slave side step-up circuit 65 being controlled so that the accumulated charge ratio SOC2 of the slave battery 60 decreases faster than the accumulated charge ratio SOC1 of the master battery 50. When the accumulated charge ratio SOC2 of the slave battery 60 becomes less than or equal to a threshold value Sref2 (for example, 25%, 30% or 35%) (steps S140 and S150), the CPU 72 switches the system main relay 66 to OFF and the system main relay 67 to ON to change from the first connection state to a second connection state (where the master battery 50 and the slave battery 62 are connected with the side of the motors MG1 and MG2 and the slave battery 60 is disconnected from the side of the motors MG1 and MG2) (step S160). Then, The hybrid vehicle 20 is driven in the motor travel priority mode while the master side step-up circuit 55 and the slave side step-up circuit 65 being controlled so that the timing at which the accumulated charge ratio SOC1 of the slave battery 50 becomes less than or equal to a threshold value Sref1 (for example, 25%, 30% or 35%) and the timing at which the accumulated charge ratio SOC3 of the slave battery 62 becomes less than or equal to a threshold value Sref3 (for example, 25%, 30% or 35%) is same and the total accumulated charge ratio SOC becomes less than or equal to a threshold value Shy (for example, 25%, 30% or 35%) at the same time. After the total accumulated charge ratio SOC becomes less than or equal to a threshold value Shy at the timing at which the accumulated charge ratio SOC1 of the slave battery 50 becomes less than or equal to a threshold value Sref1 and the accumulated charge ratio SOC3 of the slave battery 62 becomes less than or equal to a threshold value Sref3 (steps S170 and S180), the CPU 72 changes the travel mode from the motor travel priority mode to a hybrid travel priority mode, where the hybrid vehicle 20 is driven with a higher priority given to the vehicle travelling in the engine drive mode (the hybrid travel) (step S190), and switches the system main relay 67 to OFF to change from the second connection state to a slave shutoff state (where the master battery 50 is connected with the side of the motors MG1 and MG2 and both of the slave batteries 60 and 62 are disconnected from the side of the motors MG1 and MG2) (step S200). At shutdown of the system of the hybrid vehicle 20 (step S210), the CPU 72 terminates this routine.

When the total accumulated charge ratio SOC is less than the threshold value Sev at step S110, the CPU 72 sets the hybrid travel priority mode as the travel mode (step S190), and leads to the slave shutoff state (step S200). At the shutdown of the system of the hybrid vehicle 20 (step S210), the CPU 72 terminates this routine.

In the embodiment, in the case that the hybrid travel priority mode is set as the travel mode, the CPU 72 calculates a driving power Pdrv* required for driving the hybrid vehicle 20 by multiplying a torque demand Tr*, which is set based on the accelerator opening Acc from the accelerator pedal position sensor 84 and the vehicle speed V from a vehicle speed sensor 88, by a rotation speed of the driveshaft 32 (a rotation speed Nm2 of the motor MG2 or a rotation speed obtained by multiplying the vehicle speed V by a preset conversion factor). The CPU 72 then compares a power demand Pe* calculated as the sum of the calculated driving power Pdrv* and a charge-discharge power demand Pb* of the master battery 50 with the threshold value Phv which is predetermined as a little larger power than the minimum power enabling efficient operation of the engine 22. When the power demand Pe* is less than or equal to the threshold Phv, the hybrid vehicle 20 is driven in the motor travel. When the power demand Pe* is more than the threshold value Phv, on the other hand, the hybrid vehicle is driven in the hybrid travel. Such control enables the hybrid vehicle 20 to be driven efficiently. In the case that the motor travel priority mode is set as the travel mode, the CPU 72 sets the sum of the output limit Wout1 of the master battery 50 and the output limit of the connection slave battery (the sum of the output limit Wout1 of the master battery 50 and the output limit Wout2 of the slave battery 60 at the first connection state, or the sum of the output limit Wout1 of the master battery 50 and the output limit Wout3 of the slave battery 62 at the second connection state) as an output limit Wout. The CPU 72 then calculates a driving power Pdrv* required for driving the hybrid vehicle 20 by multiplying a torque demand Tr*, which is set based on the accelerator opening Acc and the vehicle speed V, by a rotation speed of the driveshaft 32. When the calculated driving power Pdrv* is less than or equal to the output limit Wout, the hybrid vehicle 20 is driven in the motor travel. When the calculated driving power Pdrv* is more than the output limit Wout, on the other hand, the hybrid vehicle is driven in the hybrid travel. The output limit Wout in the case that the motor travel priority mode is set as the travel mode is normally more than the threshold value Phv. Therefore, when the motor travel priority mode is set as the travel mode, the motor travel is allowed than when the hybrid travel priority mode is set as the travel mode. As a result, such control enables to facilitate the drive in the motor travel until the accumulated charge ratio SOC1, SOC2 and SOC3 of the master battery 50 and the slave batteries 60 and 62 lower.

Figure 4:
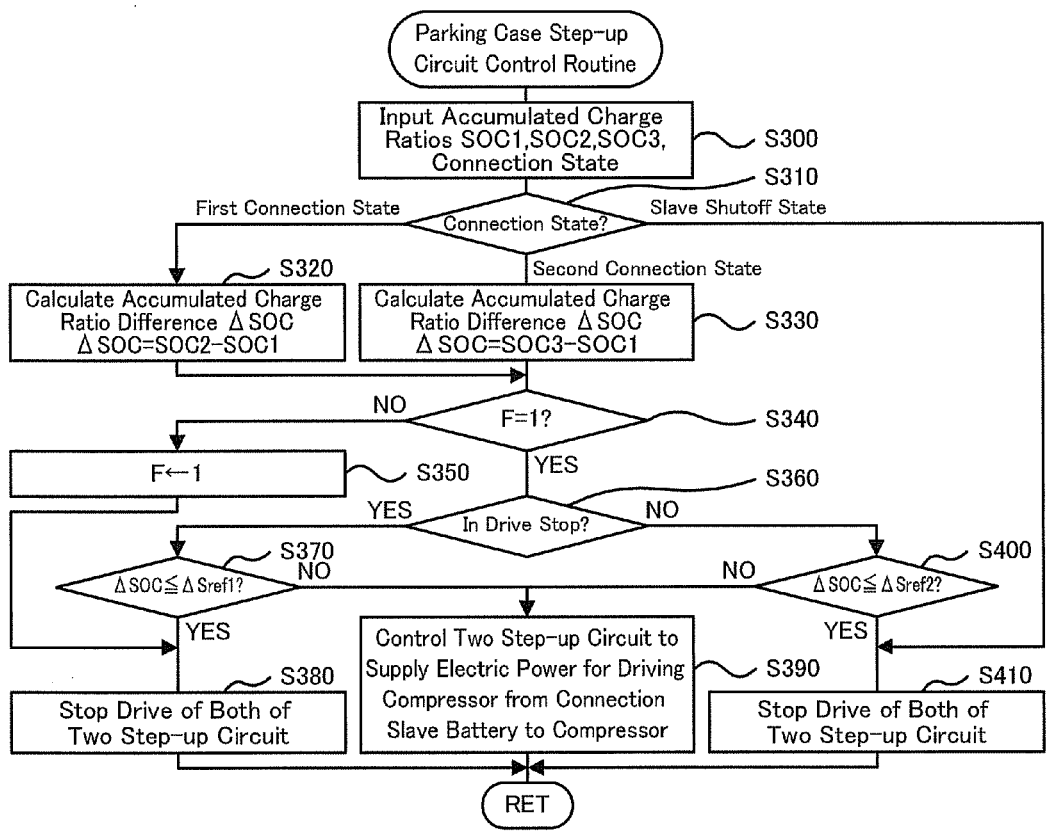
FIG. 4 is a flowchart showing a parking case step-up circuit control routine executed by the hybrid electronic control unit 70.

The description regards the control of the master side step-up circuit 55 and the slave side step-up circuit 65 in the case that gearshift position SP is the parking position. FIG. 4 is a flowchart showing a parking case step-up circuit control routine executed by the hybrid electronic control unit 70. This routine is executed repeatedly at preset time intervals (for example, at every several msec). For convenience of explanation, it is considered that the drive of both of inverters 41 and 42 is stopped and the compressor 95 in the non-illustrated air conditioner is driven as needed.

In the parking case step-up circuit control routine, the CPU 72 of the hybrid electronic control unit 70 inputs various data required for control, for example, the accumulated charge ratios SOC1, SOC2 and SOC3 of the master battery 50 and the slave batteries 60 and 62, and the connection state set by the travel mode connection state setting routine of FIG. 3 (step S300). The accumulated charge ratios SOC1, SOC2 and SOC3 of the master battery 50 and the slave batteries 60 and 62 are calculated from integrated values of the charge-discharge currents Ib1, Ib2 and Ib3 measured by the current sensors 51b, 61b and 63b, and are input from the battery ECU 52 by communication.

After the data input, the CPU 72 checks the input connection state (step S310). When the connection state is the first connection state, the CPU 72 calculates an accumulated charge ratio difference ΔSOC by subtracting the accumulated charge ratio SOC1 of the master battery 50 from the accumulated charge ratio SOC2 of the slave battery 60 (step S320). When the connection state is the second connection state, on the other hand, the CPU 72 calculates an accumulated charge ratio difference ΔSOC by subtracting the accumulated charge ratio SOC1 of the master battery 50 from the accumulated charge ratio SOC3 of the slave battery 62 (step S330).

The CPU 72 next checks a flag F (step S340). The flag F is set to value '0' as the initial value when the repetitive execution of this routine is started (when the system of the hybrid vehicle 20 is started, or when the gearshift position is changed from a position other than the parking position to the parking position). When the flag F is equal to value '0', the CPU 72 sets the flag F to value '1' (step S350), and controls the master side step-up circuit 55 and the slave step-up circuit 65 so that the drive of both of the master side step-up circuit 55 and the slave step-up circuit 65 are stopped (step S380), This routine is then terminated. This control enables to prevent noise and electricity consumption (loss) by switching the transistors T11, T12, T21 and T22, in a case that the drive of both of the inverters 41 and 42 is stopped at the gearshift position SP is a parking position at the first connection state and the second connection state (it is not necessary to transmit the electric power between the side of the motors MG1 and MG2, and both of the master battery 50 and the connection slave battery).

After the flag F is set to value '1', the CPU 72 determines whether the drive of both of the master side step-up circuit 55 and the slave side step-up circuit 65 is stopped (step S360). When the drive of both of the master side step-up circuit 55 and the slave side step-up circuit 65 is stopped, the CPU 72 compares the accumulated charge ratio difference ΔSOC with a threshold value ΔSref1 (for example, 10%, 15% or 20%) (step S370). When the accumulated charge ratio difference ΔSOC is less than or equal to the threshold value ΔSref1, the drive stop of both of the master side step-up circuit 55 and the slave side step-up circuit 65 is continued (step S380). This routine is then terminated. In this case, when the compressor 95 is driven as needed with the electric power from the master battery 50, the accumulated charge ratio SOC1 of the master battery 50 decreases and the accumulated charge ratio difference ΔSOC increases. The above threshold value ΔSref1 is used to determine whether the accumulated charge ratio SOC1 of the master battery 50 becomes somewhat smaller less than the accumulated charge ratio of the connection slave battery.

When the accumulated charge ratio difference ΔSOC is more than the threshold ΔSref1 at step S370, the master side step-up circuit 55 and the slave side step-up circuit 65 are controlled to supply the electric power Ph for driving the compressor 95 from the connection slave battery (the slave battery 60 at the first connection state, the slave battery 62 at the second connection state) to the compressor 95 (step S390). This routine is then terminated. In the embodiment, the CPU 72 sets the electric power Ph for driving the compressor 95 as the electric power demand Pbs* to transmit between the connection slave battery and the high-voltage system. The CPU 72 performs the switching control of the transistors T21 and T22 of the slave side step-up circuit 65 so that the electric power (hereafter referred to as a slave side electric power Pbs), which is transmitted between the connection slave battery and the high-voltage system, obtained as a product of the voltage VH of the high-voltage system from the voltage sensor 57a and the slave side current Ibs from the current sensor 65a, becomes the electric power demand Pbs*. The CPU 72 also performs the switching control of the transistors T11 and T12 of the master side step-up circuit 55 to supply the slave side electric power Pbs to the compressor 95. That is to say, the CPU 72 controls the slave side step-up circuit 65 to supply the electric power demand Pbs* from the connection slave battery to the high-voltage system with stepping up the voltage by the slave side step-up circuit 65, and controls the master side step-up circuit 55 to supply the electric power, which is supplied to the high-voltage system, to the compressor 95 with stepping down the voltage by the master side step-up circuit 55. This control enables to supply the electric power Ph for driving the compressor 95 from the connection slave battery via the high-voltage system to the compressor 95 without the discharge from the master battery 50. As a result, this control enables to prevent the accumulated charge ratio SOC1 of the master battery 50 from decreasing too much without changing the accumulated charge ratio of the connection slave battery.

When the master side step-up circuit 55 and the slave side step-up circuit 65 are driven, it is determined that the drive of both of the master side step-up circuit 55 and the slave side step-up circuit 65 is not stopped at step S360. The CPU 72 compares the accumulated charge ratio difference ΔSOC with a threshold value ΔSref2 (for example, 2%, 3% or 5%) that is less than the above described threshold value ΔSref1 (step S400). When the accumulated charge ratio difference ΔSOC is more than the threshold value ΔSref2, the CPU 72 drives the master side step-up circuit 55 and the slave side step-up circuit 65 (step S390), and terminates this routine. With the continuation of the control of the master side step-up circuit 55 and the slave side step-up circuit 65, the accumulated charge ratio of the connection slave battery decreases and the accumulated charge ratio difference ΔSOC decreases.

When the accumulated charge ratio difference ΔSOC becomes less than or equal to the threshold value ΔSref2, the CPU 72 controls the master side step-up circuit 55 and the slave side step-up circuit 65 so that the drive of both of the master side step-up circuit 55 and the slave side step-up circuit 65 is stopped (step S410), and terminates this routine. After the drive of both of the master side step-up circuit 55 and the slave side step-up circuit 65 is stopped, it is determined that that the drive of both of the master side step-up circuit 55 and the slave side step-up circuit 65 is stopped at step S360 when this routine is executed next time, the CPU 72 continues to stop the drive of the master side step-up circuit 55 and the slave side step-up circuit 65 until the accumulated charge ratio difference ΔSOC becomes more than the threshold value ΔSref1 (steps S370 and S380).

Figure 5:
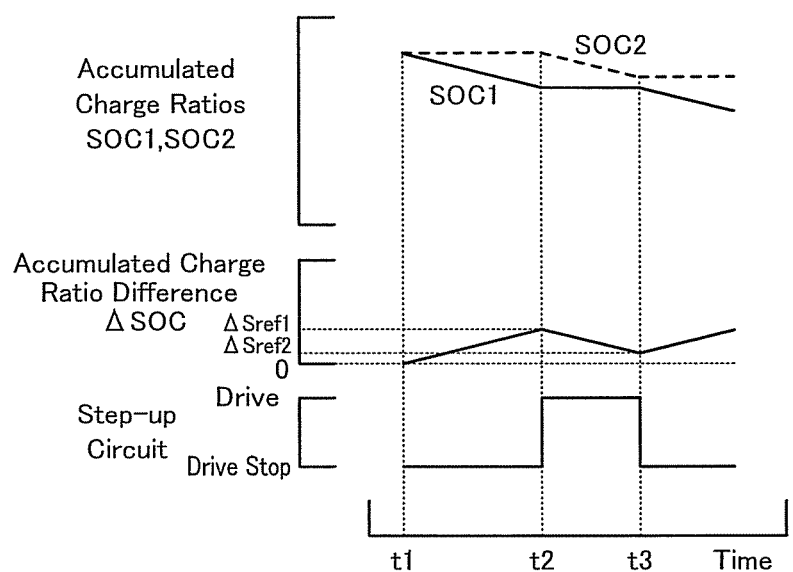
FIG. 5 is a schematic diagram of time charts of the accumulated charge ratios SOC1 and SOC2, the accumulated charge ratio difference ΔSOC, the state of the master battery 50 and the state of the slave battery 60 in a case that the accumulated charge ratios SOC1 and SOC2 of the master battery 50 and the slave battery 60 are relatively high at the first connection state and the gearshift position is the parking position.

FIG. 5 is a schematic diagram of time charts of the accumulated charge ratios SOC1 and SOC2, the accumulated charge ratio difference ΔSOC, the state of the master battery 50 and the state of the slave battery 60 in a case that the accumulated charge ratios SOC1 and SOC2 of the master battery 50 and the slave battery 60 are relatively high at the first connection state and the gearshift position is the parking position. For example, it is assumed that the drive of both of the master side step-up circuit 55 and the slave side step-up circuit 65 is stopped and the compressor 95 is continuously driven with the constant electricity consumption. As shown in FIG. 5, the accumulated charge ratio difference ΔSOC is less than or equal to the threshold value ΔSref1 at time t1. Thus, the drive of both of the master side step-up circuit 55 and the slave side step-up circuit 65 is stopped and the compressor 95 is driven with the electric power from the master battery 50. In this case, stopping the drive of both of the master side step-up circuit 55 and the slave side step-up circuit 65 enables to prevent the noise and the electricity consumption (loss) by switching the transistors T11, T12, T21 and T22 of the master side step-up circuit 55 and the slave side step-up circuit 65. The accumulated charge ratio difference ΔSOC increases with decreasing of the accumulated charge ratio SOC1 of the master battery 50. After the accumulated charge ratio difference ΔSOC becomes more than the threshold value ΔSref1 (at time t2), the master side step-up circuit 55 and the slave side step-up circuit 65 are controlled to supply the electric power Ph for driving the compressor 95 from the slave battery 60 to the compressor 95 without the discharge from the master battery 50. The electric power Ph for driving the compressor 95 is supplied from the connection slave battery via the high-voltage system to the compressor 95. The accumulated charge ratio difference ΔSOC decreases with decreasing of the accumulated charge ratio SOC2 of the slave battery 60. After the accumulated charge ratio difference ΔSOC becomes less than or equal to the threshold value ΔSref2 (at time t3), the drive of both of the master side step-up circuit 55 and the slave side step-up circuit 65 is stopped.

When the slave shutoff state at step S310, or when both of the slave batteries 60 and 62 and the side of the motors MG1 and MG2 are disconnected, the CPU 72 stops the drive of both of the master side step-up circuit 55 and the slave side step-up circuit 65 (step S410), and terminates this routine.

In the hybrid vehicle 20 of the embodiment described above, the drive of both of the master side step-up circuit 55 and the slave side step-up circuit 65 is stopped, in a case that the gearshift position is the parking position. This control enables to prevent the noise and the electricity consumption (loss) by switching the transistors T11, T12, T21 and T22. In the hybrid vehicle 20 of the embodiment, the master side step-up circuit 55 and the slave side step-up circuit 65 are controlled to supply the electric power Ph for driving the compressor 95 from the connection slave battery to the compressor 95 until the accumulated charge ratio difference ΔSOC becomes less than or equal to the threshold value ΔSref2, in a case that the accumulated charge ratio difference ΔSOC obtained by subtracting the accumulated charge ratio SOC1 of the master battery 50 from the accumulated charge ratio of the connection slave battery is more than the threshold value ΔSref1 even in the case that the gearshift position is the parking position. This control enables to supply the electric power from the connection slave battery to the compressor 95. Therefore, this control enables to prevent the accumulated charge ratio SOC1 of the master battery 50 from decreasing too much without changing the accumulated charge ratio of the connection slave battery.

In the hybrid vehicle 20 of the embodiment, the threshold values ΔSref1 and ΔSref2 is fixed to a specific value. The threshold values ΔSref1 and ΔSref2 may be set based on the accumulated charge ratio difference ΔSOC obtained at the start of the repetitive execution of the parking case step-up circuit control routine of FIG. 4 (at the system startup of the hybrid vehicle 20 or at the change of the gearshift position from a position other than the parking position to the parking position). In this case, the CPU 72 may define the accumulated charge ratio difference ΔSOC obtained at the start of the repetitive execution of this routine as a reference value ΔSOCset, set a value obtained by multiplying the reference value ΔSOCset by a predetermined value a1 (for example, 10%, 15% or 20%) as the threshold value ΔSref1, and set a value obtained by multiplying the reference value ΔSOCset by a predetermined value α2 (for example, 2%, 3% or 5%) as the threshold value ΔSref2. This arrangement enables to prevent great difference between the accumulated charge ratio difference ΔSOC obtained at the start of the repetitive execution of this routine and the accumulated charge ratio difference ΔSOC obtained at the stop of the repetitive execution of this routine (for example, on the change of the gearshift position form the parking position to the drive position or the reverse position). That is to say, this arrangement enables to prevent the accumulated charge ratio SOC1 of the master battery 50 from decreasing too much without changing the accumulated charge ratio of the connection slave battery.

In the hybrid vehicle 20 of the embodiment, the master side step-up circuit 55 and the slave side step-up circuit 65 are controlled to supply the electric power from the connection slave battery to the compressor 95 via the high-voltage system without the discharge from the master battery 50. The master side step-up circuit 55 and the slave side step-up circuit 65 may be controlled to supply the electric power from the connection slave battery to the compressor 95 via the high-voltage system while the master battery 50 is charged or discharged a little.

In the hybrid vehicle 20 of the embodiment, the master side step-up circuit 55 and the slave side step-up circuit 65 are driven, in the case that the accumulated charge ratio difference ΔSOC is more than or equal to the threshold ΔSref1 at the first connection state or at the second connection state, in the parking case. The master side step-up circuit 55 and the slave side step-up circuit 65 may not be driven regardless of the accumulated charge ratio difference ΔSOC, in the parking case.

In the hybrid vehicle 20 of the embodiment, the control of the master side step-up circuit 55 and the slave side step-up circuit 65, in a case that the compressor 95 is driven according to the requirements in the parking case, is described. The drive of both of the master side step-up circuit 55 and the slave side step-up circuit 65 may be stopped or both the master side step-up circuit 55 and the slave side step-up circuit 65 may be driven, according to comparison result between the accumulated charge ratio difference ΔSOC and the threshold value ΔSref1 or the threshold value ΔSref2, in the same way as the embodiment, in a case that the electric power is supplied from the first battery voltage system 59 to the auxiliary battery 97 by the DC-to-DC converter 96 being driven in addition to or in place of the compressor 95 being driven.

In the hybrid vehicle 20 of the embodiment, the case that the electric power is supplied from at least one of the master battery 50 and the connection slave battery to at least one of the compressor 95 and the DC-to-DC converter 96, is described. In a case that the accumulated charge ratios of the master battery 50 and the connection slave battery are low, the engine may be cranked by the motor MG1 with the electric power from the at least one of the master battery 50 and the connection slave battery, and started. After then, the master battery 50 and the connection slave battery may be charged by the electric power generated by the motor MG1 with the power from the engine 22, and the electric power generated by the motor MG1 may be supplied to at least one of the compressor 95 and the DC-to-DC converter 96.

In the hybrid vehicle 20 of the embodiment, the master battery 50 and the slave batteries 60 and 62 are constructed as lithium-ion secondary batteries having the same total capacity. This is not essential. They may be constructed as lithium-ion secondary batteries each having different whole capacity or different types of secondary batteries each having different whole capacity.

In the hybrid vehicle 20 of the embodiment, one master battery 50 and two slave batteries 60 and 62 are installed, but one master battery 50 and three or more slave batteries may be installed. In this case, when travelling with the motor travel priority mode, the master battery 50 may be connected to the side of the motors MG1 and MG2 and the three or more slave batteries may be sequentially connected to the side of the motors MG1 and MG2 as the connection state. In addition, one master battery and one slave battery may be installed, and two or more master batteries and two or more slave batteries may be installed.

In the hybrid vehicle 20 of the embodiment, one master battery 50 and two slave batteries 60 and 62 are installed, and the master battery 50 and the slave battery 60 are connected to the side of the motors MG1 and MG2 in the first connection state, while the master battery 50 and the slave battery 62 are connected to the side of the motors MG1 and MG2 in the second connection state, when travelling with the motor travel priority mode. Instead, the master battery 50 and the slave battery 62 may be connected to the side of the motors MG1 and MG2 in the first connection state, while the master battery 50 and the slave battery 60 are connected to the side of the motors MG1 and MG2 in the second connection state.

In the hybrid vehicle 20 of the embodiment, the hybrid vehicle 20 has one master battery 50, two slave batteries 60 and 62, and the system main relays 56, 66 and 67. The technique of the invention is applicable to any type of hybrid vehicles having at least one battery transmitting electric power with the side of the motors MG1 and MG2 via the first step-up circuit, and at least one battery transmitting electric power with the side of the motors MG1 and MG2 via the second step-up circuit, without distinguishing between the master battery and the slave battery.

In the hybrid vehicle 20 of the embodiment, the charger 90 is installed, but may not be installed.

Figure 6:
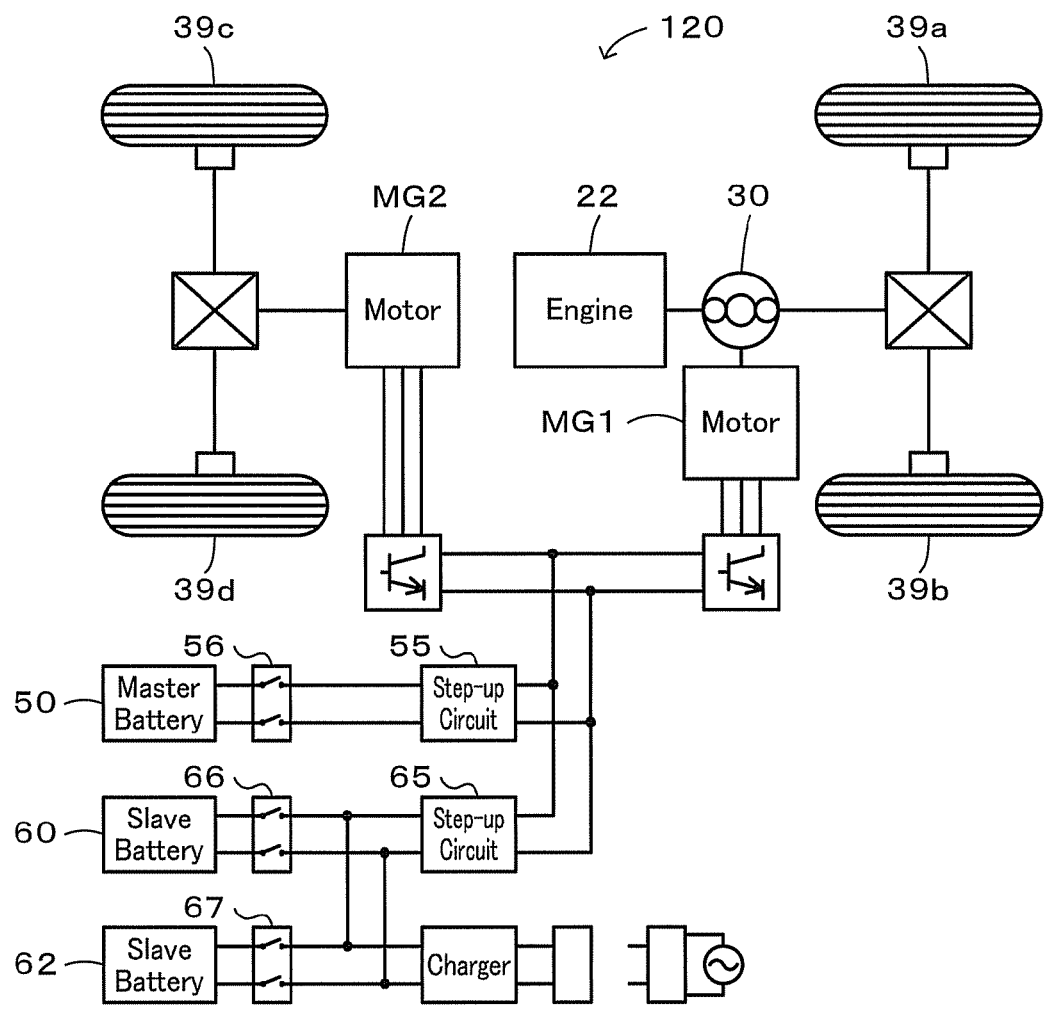
FIG. 6 schematically illustrates the configuration of another hybrid vehicle 120 in one modified example.

In the hybrid vehicle 20 of the embodiment, the power of the motor MG2 is output to the driveshaft 32. The technique of the invention is also applicable to a hybrid vehicle 120 of a modified structure shown in FIG. 6. In the hybrid vehicle 120 of FIG. 6, the power of the motor MG2 is output to another axle (an axle linked with wheels 39c and 39d) that is different from the axle connecting with the driveshaft 32 (the axle linked with the drive wheels 39a and 39b).

Figure 7:
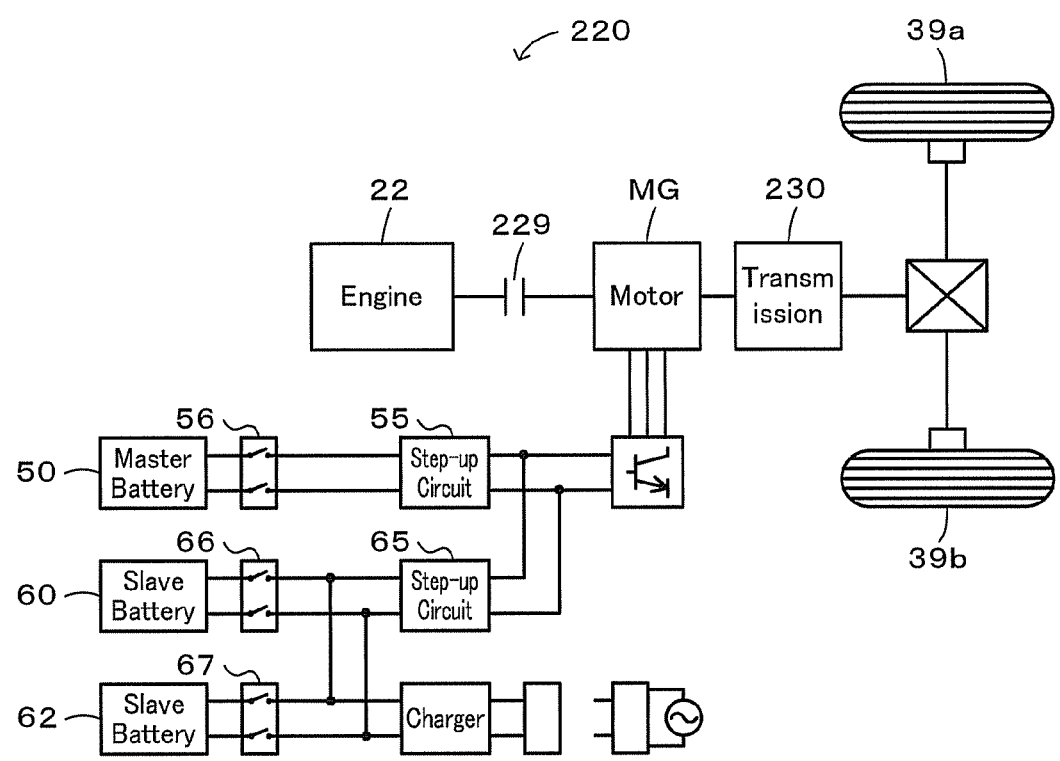
FIG. 7 schematically illustrates the configuration of still another hybrid vehicle 220 in another modified example.
Figure 8:
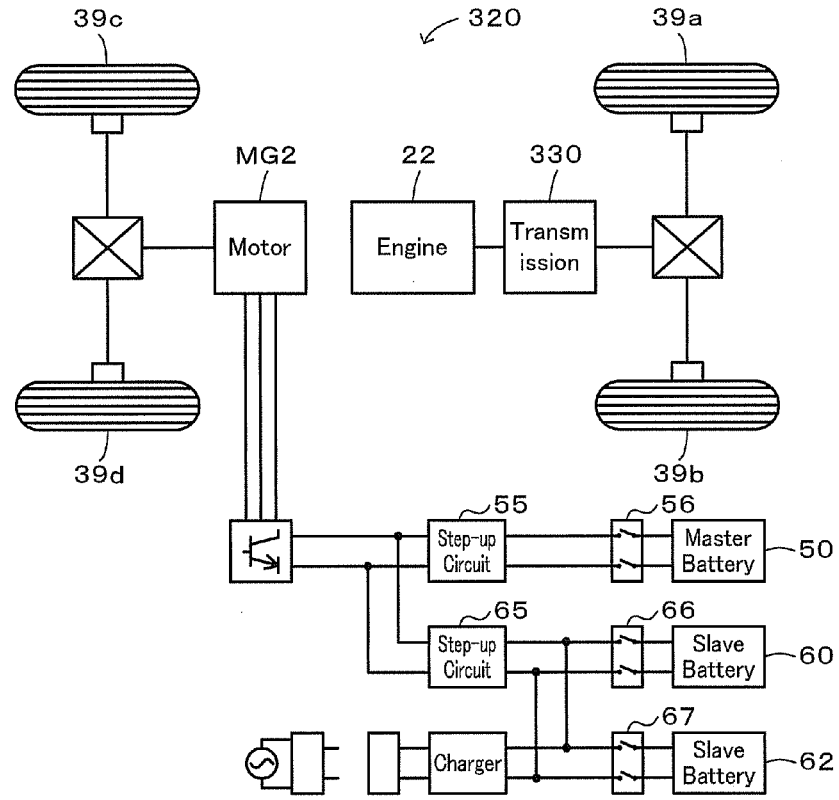
FIG. 8 schematically illustrates the configuration of another hybrid vehicle 320 in still another modified example.

In the hybrid vehicle 20 of the embodiment, the power from the engine 22 is output via the power distribution integration mechanism 30 to the driveshaft 32 linked to the driving wheels 39a and 39b, and the power from the motor MG2 is output to the driveshaft 32. The technique of the invention is also applicable to a hybrid vehicle 220 of a modified structure shown in FIG. 7. In the hybrid vehicle 220 of FIG. 7, the motor MG is attached via a transmission 230 to a driveshaft linked to the driving wheels 39a and 39b and the engine 22 is connected via a clutch 229 to the rotating shaft of the motor MG. In this hybrid vehicle 220, the power from the engine 22 is output to the driveshaft via the rotating shaft of the motor MG and the transmission 230, and the power from the motor MG is output via the transmission 230 to the driveshaft. The technique of the invention is also applicable to a hybrid vehicle 320 of a modified structure shown in FIG. 8. In the hybrid vehicle 320 of FIG. 8, the power from the engine 22 is output via a transmission 330 to the axle linked with the driving wheels 39a and 39b, and the power from the motor MG is output to another axle (an axle linked with wheels 39c and 39d of FIG. 8) that is different from the axle linked with the driving wheels 39a and 39b.

Figure 9:
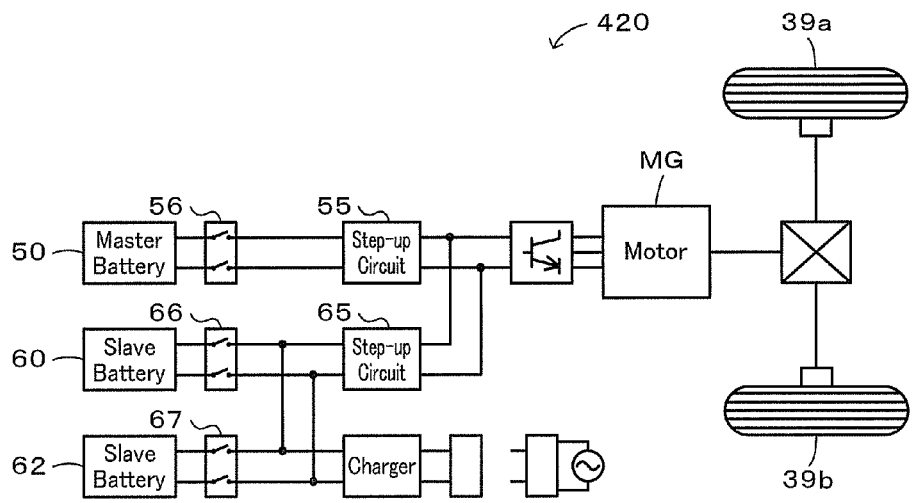
FIG. 9 schematically illustrates the configuration of electric vehicle 420 in one modified example.

In the embodiment, the invention is applied to the hybrid vehicle 20 having the engine 22 and the motor MG1 that are connected via planetary gear 30 with the driveshaft 32, the motor MG2 that are connected with the driveshaft 32. The technique of the invention is also applicable to an electric vehicle 420 of a modified structure shown in FIG. 9. In the electric vehicle 420 of FIG. 9, the electric vehicle has the motor MG that outputs the power for driving the electric vehicle.

In the above embodiment or another modified example, the invention is described using an application to an electric vehicle or a hybrid vehicle. The invention may be applied to a control method of an electric vehicle or a hybrid vehicle.

The primary elements in the embodiment and its modified examples are mapped to the primary constituents in the claims of the invention as described below. The motor MG2 in the embodiment corresponds to the 'motor' in the claims of the invention. The master battery 50 constructed as a lithium-ion secondary battery in the embodiment corresponds to the 'first battery unit' in the claims of the invention. The slave batteries 60 and 62 each constructed as a lithium-ion secondary battery in the embodiment corresponds to the 'second battery unit' in the claims of the invention. The master side step-up circuit 55 in the embodiment corresponds to the 'first step-up/down circuit' in the claims of the invention. The slave side step-up circuit 65 in the embodiment corresponds to the 'second step-up/down circuit' in the claims of the invention. The hybrid electronic control unit 70 executing the parking case step-up circuit control routine of FIG. 4 to stop the drive of both of the master side step-up circuit 55 and the slave side step-up circuit 65 in the case that gearshift position SP is the parking position in the embodiment corresponds to the 'control module' in the claims of the invention. The compressor 95 and the DC-to-DC converter 96 in the embodiment correspond to the 'device' in the claims of the invention. The system main relay 56 in the embodiment corresponds to the 'first connect/disconnect unit' in the claims of the invention. The system main relays 66 and 67 in the embodiment correspond to the 'second connect/disconnect unit' in the claims of the invention. The engine 22 in the embodiment corresponds to the 'internal combustion engine' in the claims of the invention. The motor MG1 in the embodiment corresponds to the 'generator' in the claims of the invention. The planetary gear 30 in the embodiment corresponds to the 'planetary gear mechanism' in the claims of the invention.

The 'motor' is not restricted to the motor MG2 constructed as a synchronous motor generator but may be any other type of motor constructed to input and output power to a driveshaft, for example, an induction motor. The 'first battery unit' is not restricted to the master battery 50 constructed as a lithium-ion secondary battery but may be any other thing including at least one secondary battery, for example, two or more master batteries, and at least one secondary battery other than lithium-ion battery (for example, nickel metal hydride secondary battery, nickel cadmium secondary battery, and lead acid secondary battery). The 'second battery unit' is not restricted to the slave batteries 60 and 62 each constructed as a lithium-ion secondary battery but may be any other thing including at least one secondary battery, for example, one slave battery, three or more slave batteries, and at least one secondary battery other than lithium-ion battery (for example, nickel metal hydride secondary battery, nickel cadmium secondary battery, and lead acid secondary battery). The 'first step-up/down circuit' is not restricted to the master side step-up circuit 55 but may be any other thing transmitting electric power with voltage regulation between a first battery voltage system connected to the at least one secondary battery of the first battery unit and a motor side. The 'second step-up/down circuit' is not restricted to the slave side step-up circuit 65 but may be any other thing transmitting electric power with voltage regulation between a second battery voltage system connected to the at least one secondary battery of the second battery unit and the motor side. The 'control module' is not restricted to stopping the drive of both of the master side step-up circuit 55 and the slave side step-up circuit 65 in the case that gearshift position SP is the parking position but may be any other thing controlling the first step-up/down circuit and the second step-up/down circuit so that drive of both of the first step-up/down circuit and the second step-up/down circuit is stopped in a parking case that a gearshift position is a parking position. The 'device' is not restricted to the compressor 95 and the compressor 95 and the DC-to-DC converter 96 but may be any other thing connected to the first voltage system. The 'first connect/disconnect unit' is not restricted to the system main relay 56 but may be any other thing connecting and disconnecting the at least one secondary battery of the first battery unit to and from the motor side. The 'second connect/disconnect unit' is not restricted to the system main relays 66 and 67 but may be any other thing connecting and disconnecting the at least one secondary battery of the second battery unit to and from the motor side. The 'internal combustion engine' is not restricted to the engine 22 designed to consume a hydrocarbon fuel, such as gasoline or light oil, and thereby output power, but may be an internal combustion engine of any other design, for example, a hydrogen engine. The 'generator' is not restricted to the motor MG1 constructed as a synchronous motor generator but may be any other type of motor constructed to input and output power, for example, an induction motor. The 'Planetary gear mechanism' is not restricted to the planetary gear 30 but may be any other thing with three elements each connected to three shafts, an output shaft of the internal combustion engine, a rotating shaft of the generator, and a driveshaft linked to an axle of the electric vehicle.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the electric vehicles.

The invention claimed is:
1. An electric vehicle driven with output power from a motor, comprising:
a first battery unit that has at least one secondary battery;
a second battery unit that has at least one secondary battery;
a first step-up/down circuit that transmits electric power with voltage regulation between a first battery voltage system connected to the at least one secondary battery of the first battery unit and a motor side;

a second step-up/down circuit that transmits electric power with voltage regulation between a second battery voltage system connected to the at least one secondary battery of the second battery unit and the motor side; and a control module that controls the first step-up/down circuit and the second step-up/down circuit so that drive of both of the first step-up/down circuit and the second step-up/down circuit is stopped in a parking case that a gearshift position is a parking position, wherein the control module controls the first step-up/down circuit and the second step-up/down circuit to supply electric power from the at least one secondary battery of the second battery unit to at least one device connected to the first battery voltage system until an accumulated charge ratio difference becomes less than or equal to a second predetermined value that is less than a predetermined value, in a case that the accumulated charge ratio difference is more than the predetermined value even in the parking case, the accumulated charge ratio difference being obtained by subtracting a first accumulated charge ratio that is a ratio of an accumulated charge amount of the at least one secondary battery of the first battery unit to whole capacity of the at least one secondary battery of the first battery unit from the second accumulated charge ratio that is a ratio of an accumulated charge amount of the at least one secondary battery of the second battery unit to whole capacity of the at least one secondary battery of the second battery unit.

2. The electric vehicle in accordance with claim 1, wherein the control module controls the first step-up/down circuit and the second step-up/down circuit to supply the electric power from the at least one secondary battery of the second battery unit to the at least one device connected to the first battery voltage system until the accumulated charge ratio difference becomes less than or equal to the second predetermined value, in a case that the accumulated charge ratio difference becomes more than the predetermined value by electric power supply from the at least one secondary battery of the first battery unit to the at least one device connected to the first battery voltage system in the parking case.

3. The electric vehicle in accordance with claim 1, wherein the at least one device connected to the first battery voltage system includes at least one of a compressor in an air conditioner, and a DC-to-DC converter connected to the first battery voltage system and an auxiliary secondary battery supplying electric power to accessories.

4. An electric vehicle driven with output power from a motor, comprising:
a first battery unit that has one main secondary battery as a secondary battery;
a second battery unit that has two or more auxiliary secondary batteries as secondary batteries;
a first connect/disconnect unit that connects and disconnects the at least one secondary battery of the first battery unit to and from the motor side; and
a second connect/disconnect unit that connects and disconnects the at least one secondary battery of the second battery unit to and from the motor side,
a first step-up/down circuit that transmits electric power with voltage regulation between a first battery voltage system connected to the at least one secondary battery of the first battery unit and the motor side;
a second step-up/down circuit that transmits electric power with voltage regulation between a second battery voltage system connected to the at least one secondary battery of the second battery unit and the motor side; and
a control module that controls the first step-up/down circuit and the second step-up/down circuit so that drive of both of the first step-up/down circuit and the second step-up/down circuit is stopped in a parking case that a gearshift position is a parking position,
wherein the control module controls the main connect/disconnect unit so that the main secondary battery is connected to the motor side and controls the second connect/disconnect unit so that the auxiliary secondary batteries are sequentially switched and connected to the motor side.

5. The electric vehicle in accordance with claim 1, the electric vehicle further comprising:
an internal combustion engine;
a generator that inputs and outputs power; and
a planetary gear mechanism with three elements each connected to three shafts, an output shaft of the internal combustion engine, a rotating shaft of the generator, and a driveshaft linked to an axle of the electric vehicle,
wherein the first step-up/down circuit transmits electric power with voltage regulation between the first battery voltage system and both of the generator and the motor, and
the second step-up/down circuit transmits electric power with voltage regulation between the second battery voltage system and both of the generator and the motor.

6. A control method of an electric vehicle having a motor that inputs and outputs power for driving the electric vehicle, a first battery unit that has at least one secondary battery, a second battery unit that has at least one secondary battery, a first step-up/down circuit that transmits electric power with voltage regulation between a first battery voltage system connected to the at least one secondary battery of the first battery unit and a motor side, and a second step-up-down circuit that transmits electric power with voltage regulation between a second battery voltage system connected to the at least one secondary battery of the second battery unit and the motor side, the control method of the electric vehicle comprising:
controlling the first step-up/down circuit and the second step-up/down circuit so that drive of both of the first step-up/down circuit and drive of the second step-up/down circuit are stopped in a parking case that a gearshift position is a parking position,
wherein controlling the first step-up/down circuit and the second step-up/down circuit to supply electric power from the at least one secondary battery of the second battery unit to at least one device connected to the first battery voltage system until an accumulated charge ratio difference becomes less than or equal to a second predetermined value that is less than a predetermined value, in a case that the accumulated charge ratio difference is more than the predetermined value even in the parking case, the accumulated charge ratio difference being obtained by subtracting a first accumulated charge ratio that is a ratio of an accumulated charge amount of the at least one secondary battery of the first battery unit to whole capacity of the at least one secondary battery of the first battery unit from the second accumulated charge ratio that is a ratio of an accumulated charge amount of the at least one secondary battery of the second battery unit to whole capacity of the at least one secondary battery of the second battery unit.

7. The control method of the electric vehicle in accordance with claim 6, wherein controlling the first step-up/down circuit and the second step-up/down circuit to supply the electric power from the at least one secondary battery of the second battery unit to the at least one device connected to the first battery voltage system until the accumulated charge ratio difference becomes less than or equal to the second predetermined value, in a case that the accumulated charge ratio difference becomes more than the predetermined value by electric power supply from the at least one secondary battery of the first battery unit to the at least one device connected to the first battery voltage system in the parking case.

* * * * *

UNITED STATES PATENT AND TRADEMARK OFFICE
CERTIFICATE OF CORRECTION

| | |
|---|---|
| PATENT NO. | : 8,723,457 B2 |
| APPLICATION NO. | : 13/320207 |
| DATED | : May 13, 2014 |
| INVENTOR(S) | : M. Komatsu |

It is certified that error appears in the above-identified patent and that said Letters Patent is hereby corrected as shown below:

In The Specification

At column 10, line 44, change "Then, The hybrid" to -- Then, the hybrid --.

At column 10, line 54, change "value Shy" to -- value Shv --.

At column 10, line 56, change "value Shy" to -- value Shv --.

At column 12, line 33, change "(step S380), This routine" to -- (step S380). This routine --.

At column 12, lines 60-61, change "becomes somewhat smaller less than" to -- becomes somewhat less than --.

At column 13, line 56, change "that that the drive" to -- that the drive --.

At column 15, line 7, change "value a1" to -- value $\alpha 1$ --.

In the Claims

At column 20, line 36, change "a second step-up-down" to -- a second step-up/down --.

Signed and Sealed this
Twenty-seventh Day of January, 2015

Michelle K. Lee
*Deputy Director of the United States Patent and Trademark Office*